United States Patent [19]
Murphy et al.

[11] Patent Number: 5,090,018
[45] Date of Patent: Feb. 18, 1992

[54] PULSED LASER SYSTEM FOR VISUALLY DETECTING FAULTS IN OPTICAL WAVEGUIDES

[75] Inventors: Cary R. Murphy; Mark K. Bridges, both of Hickory, N.C.

[73] Assignee: Siemens Aktiengesellschaft, Munich, Fed. Rep. of Germany

[21] Appl. No.: 562,103

[22] Filed: Aug. 2, 1990

[51] Int. Cl.⁵ .............................................. G02B 6/26
[52] U.S. Cl. ................................ 372/30; 250/227.14; 250/227.19; 356/44
[58] Field of Search ................. 350/96.15; 250/227.14, 250/227.19; 356/44

[56] References Cited

U.S. PATENT DOCUMENTS

| | | | |
|---|---|---|---|
| 4,654,520 | 3/1987 | Griffiths | 350/96.15 |
| 4,812,645 | 3/1989 | Griffiths | 250/227.14 |
| 4,823,166 | 4/1989 | Hartog et al. | 250/227.19 |

*Primary Examiner*—Leon Scott, Jr.
*Attorney, Agent, or Firm*—J. David Abernethy

[57] ABSTRACT

A pulsed laser system for visually detecting faults in optical waveguides. A laser operating at a duty cycle of less than fifty percent (50%) produces visible light pulses at a frequency sufficiently high as to visually appear to be continuous. The laser is coupled to an optical waveguide by a connector. Faults are located due to a visible glow at a defective point on the waveguide.

14 Claims, 5 Drawing Sheets

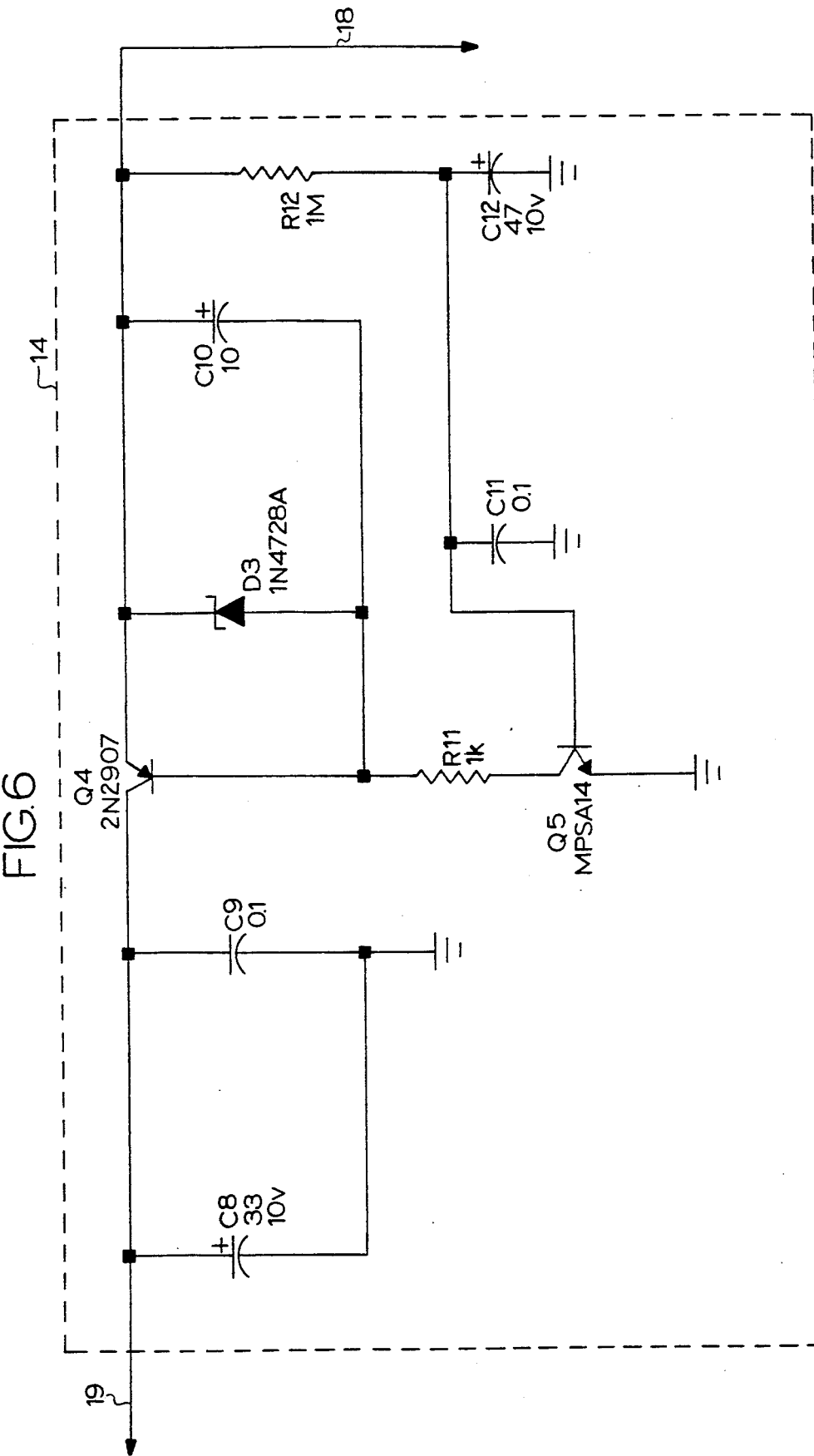

PULSED LASER SYSTEM FOR VISUALLY DETECTING FAULTS IN OPTICAL WAVEGUIDES

BACKGROUND OF THE INVENTION

The invention is in the field of visible fault locators used to locate faults in optical waveguides with the use of a laser. Such fault locators package a laser producing light in the visible range coupled to a common fiber optic connector. The package is connected to an optical waveguide or a cabled optical waveguide terminated with a similar connector. When the unit is turned on, the laser light is emitted into a waveguide. The user can observe a visible glow at a location where there is a break or microbend in a waveguide, even one having a jacket.

Some visible fault locators operate in a modulation mode of one or two Hz at a fifty percent (50%) duty cycle; this means that power is emitted in an on-off fashion during transmission, at a ratio of on fifty percent (50%) of the time and off fifty percent (50%) of the time. A one or two Hz frequency produces a light which visibly pulses in a manner like a flashing neon sign. Other visible fault locators shine continuously; many operators seem to prefer working with a continuous beam.

While visible fault locators allow fast cable inspections, their major disadvantage is the inherent danger to the eye posed by direct exposure to laser radiation. This danger persists even at a fifty percent (50%) duty cycle, which reduces optical output power by half. Therefore, a locator is needed which satisfies the desire for a continuous beam and maintains brightness while minimizing optical power output, reducing a serious health occupational safety hazard and incidentally increasing battery life.

SUMMARY OF THE INVENTION

The visible fault indicator disclosed herein uses a laser producing visible light which is pulsed, but the pulses occur so rapidly so as to visually appear to be continuous. Even at a recommended duty cycle of only ten percent (10%), such a pulsed beam appears "brighter" than a continuous, nonpulsed beam.

A duty cycle of only ten percent (10%) provides only one-tenth the optical power of a continuous wave fault locator and one-fifth the optical power of known models operating at a fifty percent (50%) duty cycle. The reduction in optical power output provides a safety advantage to the user. However, at least partially due to the "brightness" appearance previously described, output is nonetheless sufficient for its intended purpose, that is, to visually locate faults.

BRIEF DESCRIPTION OF THE DRAWINGS

The description of the preferred embodiment will be set out with reference to the drawing figures described below.

DETAILED DESCRIPTION OF THE PREFERRED EMBODIMENT

Figure 1:
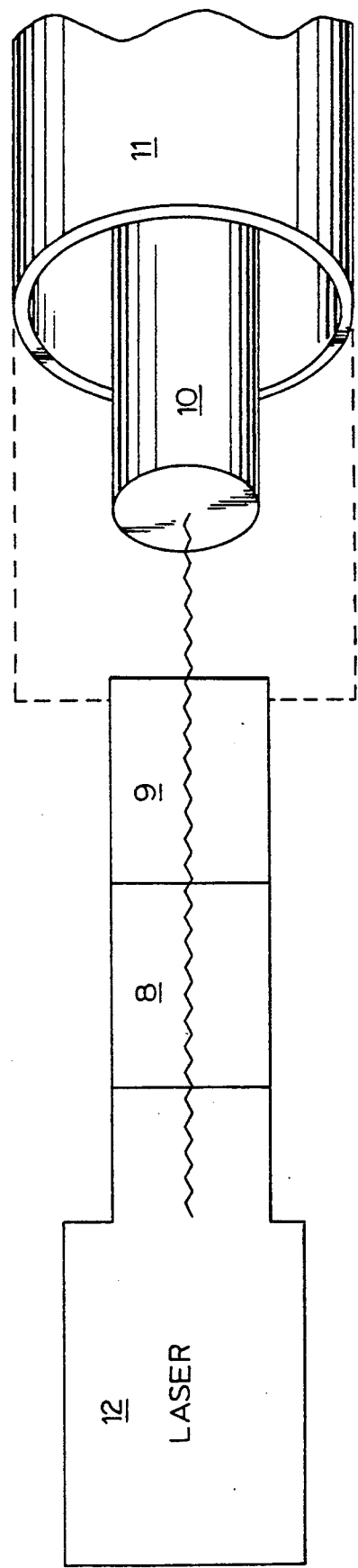
FIG. 1 is a perspective view of a laser emitting radiation into a jacketed optical fiber.

FIG. 1 shows the basic features common to any visual fault locator system. Laser 12 emits visible laser radiation into optical waveguide 10. Optical waveguide 10 is contained in cable jacket 11. Laser 12 and optical waveguide 10 will typically be provided with fiber optic connectors such as FC, biconic, or the like, denoted generally by elements 8 and 9 in FIG. 1.

Figure 2:
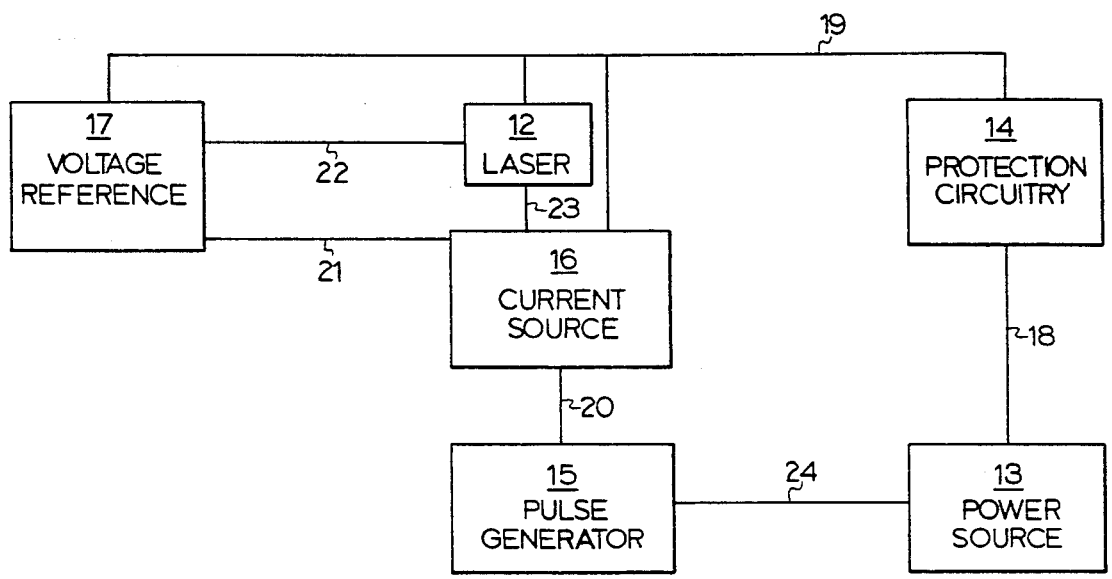
FIG. 2 is a schematic diagram of the basic features of the electrical components providing current to the laser.

FIG. 2 begins with the power source 13, which normally contains a battery, but also possibly other sources such as a motor vehicle cigarette lighter. After passing through lead 18 and current protection circuitry 14, approximately four volts are supplied through lead 19 to laser 12, current source 16, and voltage reference 17.

Figure 3:
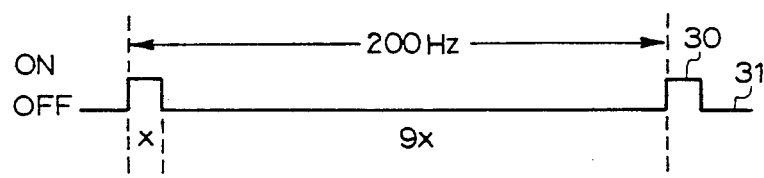
FIG. 3 is a representation of the ten percent (10%) duty cycle output of the laser; and, FIGS. 4, 5, and 6 are more detailed diagrams of the electrical components of FIG. 2.

Approximately 4.2 volts are also supplied through lead 24 to pulse generator 15, which includes a common CMOS timer circuit producing a ninety percent (90%) duty cycle squarewave electrical current through lead 20. This current shuts off current source 16, so current flows through current source 16 on lead 23 to laser 12 only ten percent (10%) of the time. Shown in FIG. 3 is a representation of the squarewave output of laser 12 into optical waveguide 10. The squarewave is ON as at 30 and OFF as at 31, with an edge-to-edge frequency of 200 Hz. The output of pulse generator 15 is the reverse of the wave diagram of FIG. 3, and could be obtained by reversing the words "ON" and "OFF" in FIG. 3.

Output from laser 12 is also sent by lead 22 to voltage reference 17, which makes any appropriate adjustments in the voltage it supplies to current source 16. Therefore, laser 12, lead 22, voltage reference 17, lead 21, current source 16, and lead 23 serve as a continuous feedback loop to provide constant output from laser 12.

Figure 4:
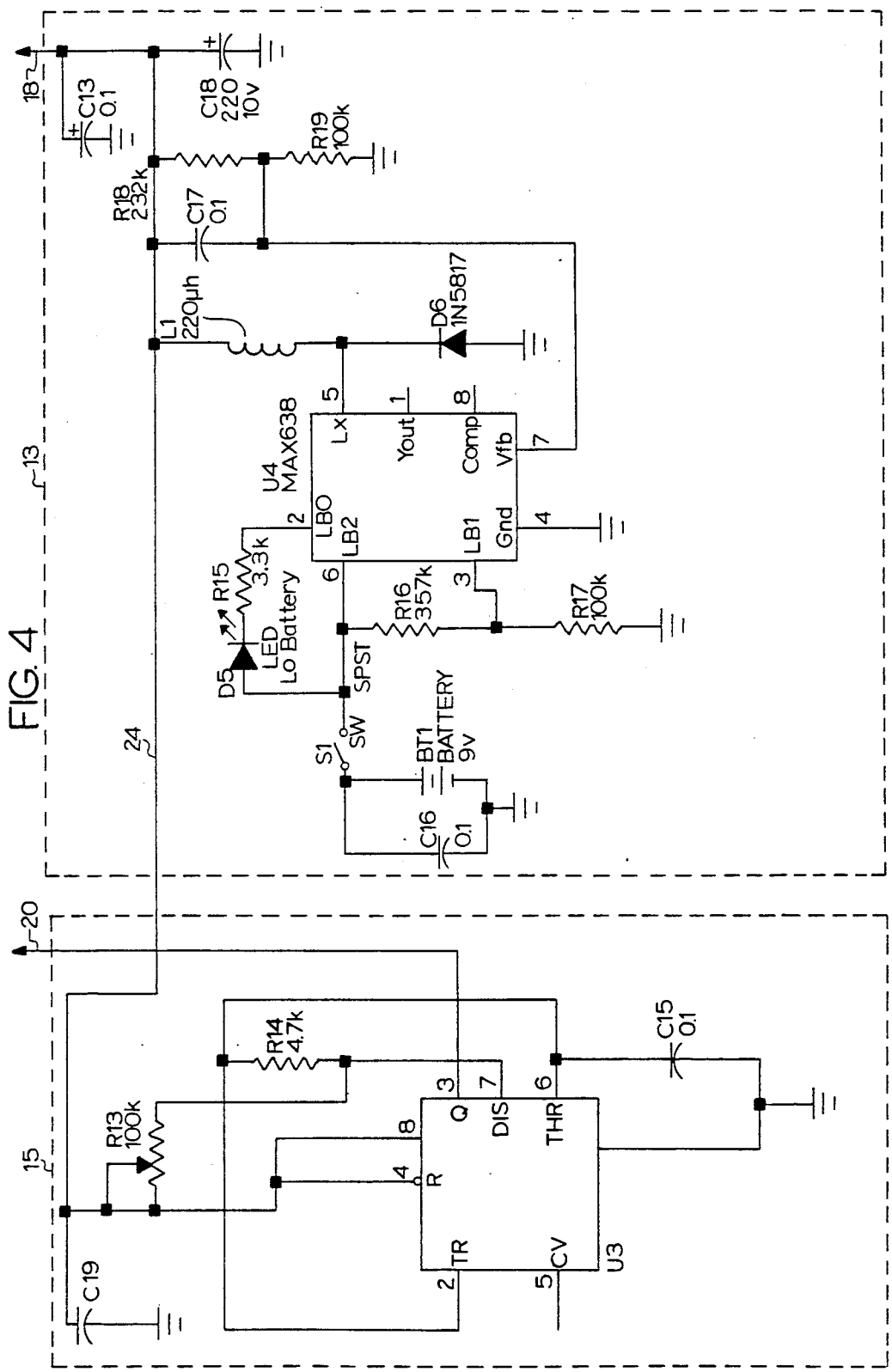
Figure 5:
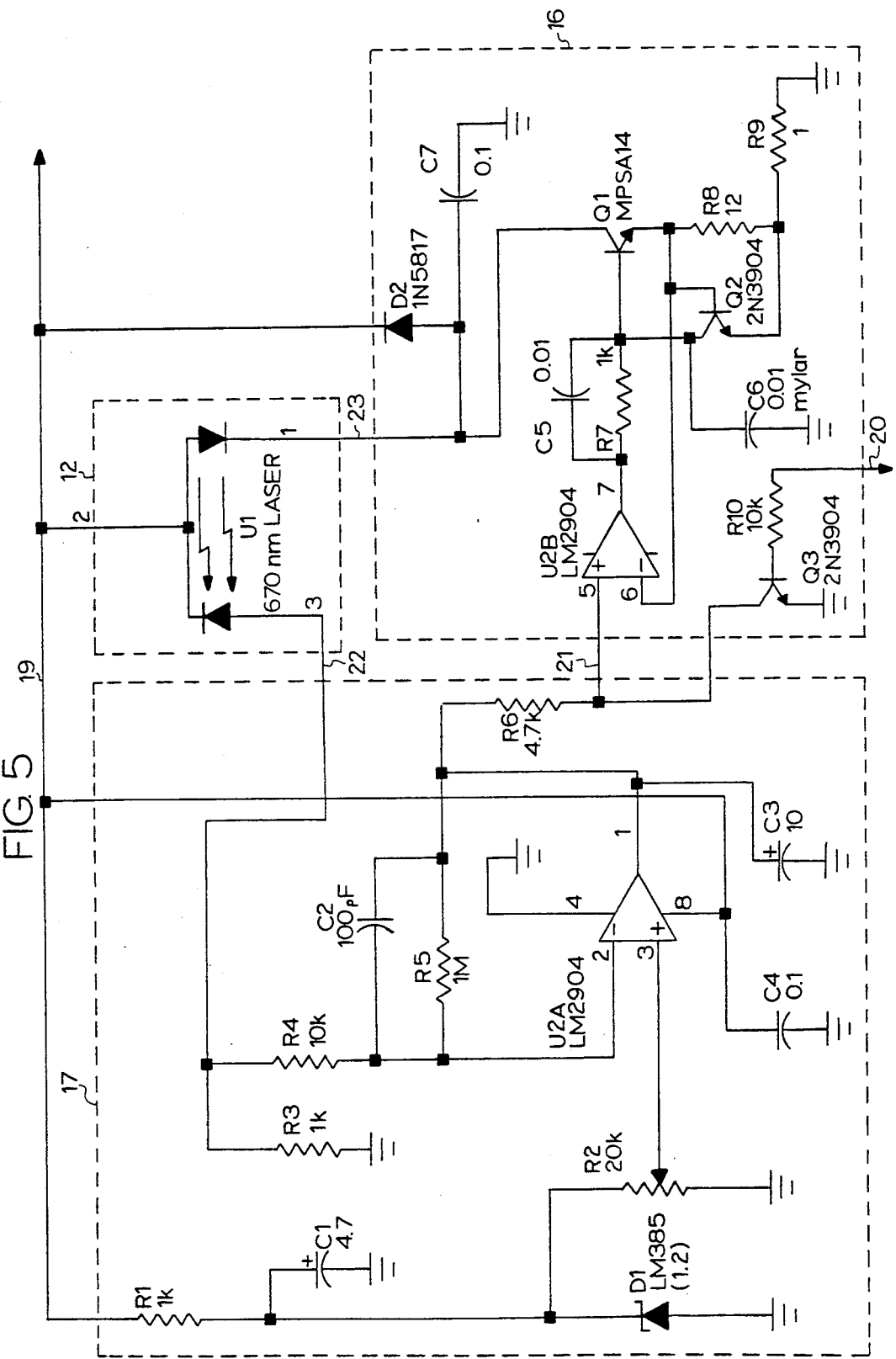

The detailed wiring diagram for the preferred embodiment of the invention is shown in FIGS. 4, 5, and 6. In FIG. 4, when the user desires to conduct a test, switch S1 is closed, powering nine-volt battery BT1. Voltage is thus supplied to pin 6 of voltage regulator U4, which may be a Maxim 638. Pin 3 of U4 serves as a reference for low battery output pin 2 of U4, so that when voltage from BT1 falls below a certain amount, current is sent from pin 2 of U4 to D5, which is an LED serving as a low battery indicator light for the user. Power is output from pin 5 of U4. Pin 7 of U4 is an input pin to receive feedback voltage. Inductor L1 and capacitors C13, C17, and C18 serve to cause a DC current to be supplied on lead 24 to pulse generator 15 and on lead 18 to protection circuitry 14.

The DC current arrives at input pin 8 of pulse generator integrated circuit U3, which may be a CMOS 555. U3 sends out on pin 3 a pulsed voltage having a ninety percent (90%) duty cycle at 200 Hz as above described. This pulsed voltage arrives at the base of transistor Q3 in FIG. 5. When voltage is present at the base of Q3, Q3 is activated, causing a voltage drop at pin 5 of op amplifier U2B, so that no voltage is provided through U2B to the base of transistor Q1. On the other hand, when no voltage is present at the base of Q3, pin 5 of U2B is at a high voltage so that current flows through U2B to the base of transistor Q1.

When voltage is at the base of Q1, current flows through Q1 from pin 1 of LASER U1, completing a circuit from battery BT1 and allowing the laser to operate. When no voltage is at the base of Q1, the laser does not operate. It will be seen that the laser U1 operates when U3 is in its "off" cycle and does not operate when U3 is in its "on" cycle; a ninety percent (90%) duty cycle from U3 causes a ten percent (10%) duty cycle on U1.

Laser 12 can be damaged if an excessive amount of current is drawn through lead 23 due to excessive high temperature operation or circuitry failure. The function of transistor Q2 and resistor R8 is to provide an upper current limit function for current source 16 powering laser 12 through lead 23.

The current drawn through laser 12 on lead 23 is also drawn through R8 and will produce a proportional voltage drop which is placed on the base and emitter of Q2. The collector of Q2 is connected to the base of Q1. When the current through lead 23 reaches a predetermined amount, the voltage drop across R8 will turn Q2 on. When this happens, the collector of Q2 will begin to cut off the voltage applied to the base of Q1, thus limiting the current draw through lead 23 and laser 12.

Inverting amplifier U2A acts as a voltage reference. Input pin 2 of U2A receives voltage developed across resistor R3 due to current from output pin 3 of LASER U1. Voltage at pin 2 of U2A is compared with reference voltage at pin 3 of U2A, which is set by making the desired setting on potentiometer R2. When the voltage at pin 2 of U2A drops below the reference voltage at pin 3 of U2A, increased voltage is sent to pin 5 of U2B. When the voltage at pin 2 of U2A is greater than the reference voltage at pin 3 of U2A, less voltage is sent to pin 5 of U2B. This self-correcting feedback loop through U2B and laser U1 serves to keep laser U1 at a constant optical output during ON time.

When S1 is closed and voltage appears at lead 18, it may be possible for initial current surges to damage or destroy the laser. The protection circuitry in FIG. 6 consisting of Q4 and Q5 allows the voltage applied to the laser to be turned on slowly at a predetermined rate after power is applied to lead 18.

Resistor R12 and capacitor C12 form a RC timing circuit. When power is applied to lead 18, C12 will slowly charge through R12. When the voltage at the R12–C12 junction reaches 0.5 v, transistor Q5 will be turned on. This produces a current through R11 that turns on Q4. The time required for C12 to charge to this level is approximately five seconds. This allows the voltage at lead 19 to slowly be applied via Q4 over the five second time period.

Diode D3 is a 3 volt zener diode. When Q5 is turned on, current will flow through D3 and R11, turning Q4 on. D3 limits the voltage differential between the emitter and collector of Q4 to 3 volts to protect it from damage. Capacitors C8, C9, C10 and C11 prevent errant voltage spikes from occurring on lead 9.

We claim:

1. A pulsed laser fault location system, comprising:
   an optical waveguide having faults therein from which faults light pulses may escape; and,
   a laser optically coupled to said optical waveguide, said laser producing light pulses in the visible range at a frequency sufficiently high as to visually appear to be continuous.

2. A pulsed laser system as recited in claim 1, wherein the laser output is at a duty cycle of less than fifty percent.

3. A pulsed laser system as recited in claim 2, wherein the laser output is at a duty cycle of less than twenty percent.

4. A pulsed laser system as recited in claim 3, wherein the laser output is at a duty cycle not greater than ten percent.

5. A pulsed laser fault location system, comprising:
   an optical waveguide having faults therein from which faults light pulses may escape; and,
   a laser optically coupled to said optical waveguide, said laser producing light pulses in the visible range at a frequency greater than two Hertz.

6. A pulsed laser system as recited in claim 5, wherein the laser output is at a duty cycle of less than fifty percent.

7. A pulsed laser system as recited in claim 6, wherein the laser output is at a duty cycle of less than twenty percent.

8. A pulsed laser system as recited in claim 7, wherein the laser output is at a duty cycle not greater than ten percent.

9. A pulsed laser fault location system, comprising:
   an optical waveguide having faults therein from which faults light pulses may escape; and,
   a laser optically coupled to said optical waveguide, said laser producing light pulses in the visible range, said laser output at a duty cycle of less than fifty percent.

10. A pulsed laser system as recited in claim 9, wherein said laser output is at a duty cycle of less than twenty percent.

11. A pulsed laser system as recited in claim 10, wherein said laser output is at a duty cycle not greater than ten percent.

12. A pulsed laser system as recited in claim 11, wherein said laser output is at a frequency greater than two Hertz.

13. A pulsed laser system as recited in claim 10, wherein said laser output is at a frequency greater than two Hertz.

14. A pulsed laser system as recited in claim 9, wherein the laser output is at a frequency greater than two Hertz.

* * * * *